J. PATTEN.
ATOMIZER FOR FLUIDS.
APPLICATION FILED APR. 23, 1914.

1,219,994.

Patented Mar. 20, 1917.
2 SHEETS—SHEET 1.

Witnesses
G. T. Baker.
G. C. Denny.

Inventor
John Patten
By Foster Freeman Watson & Coit
Attorneys

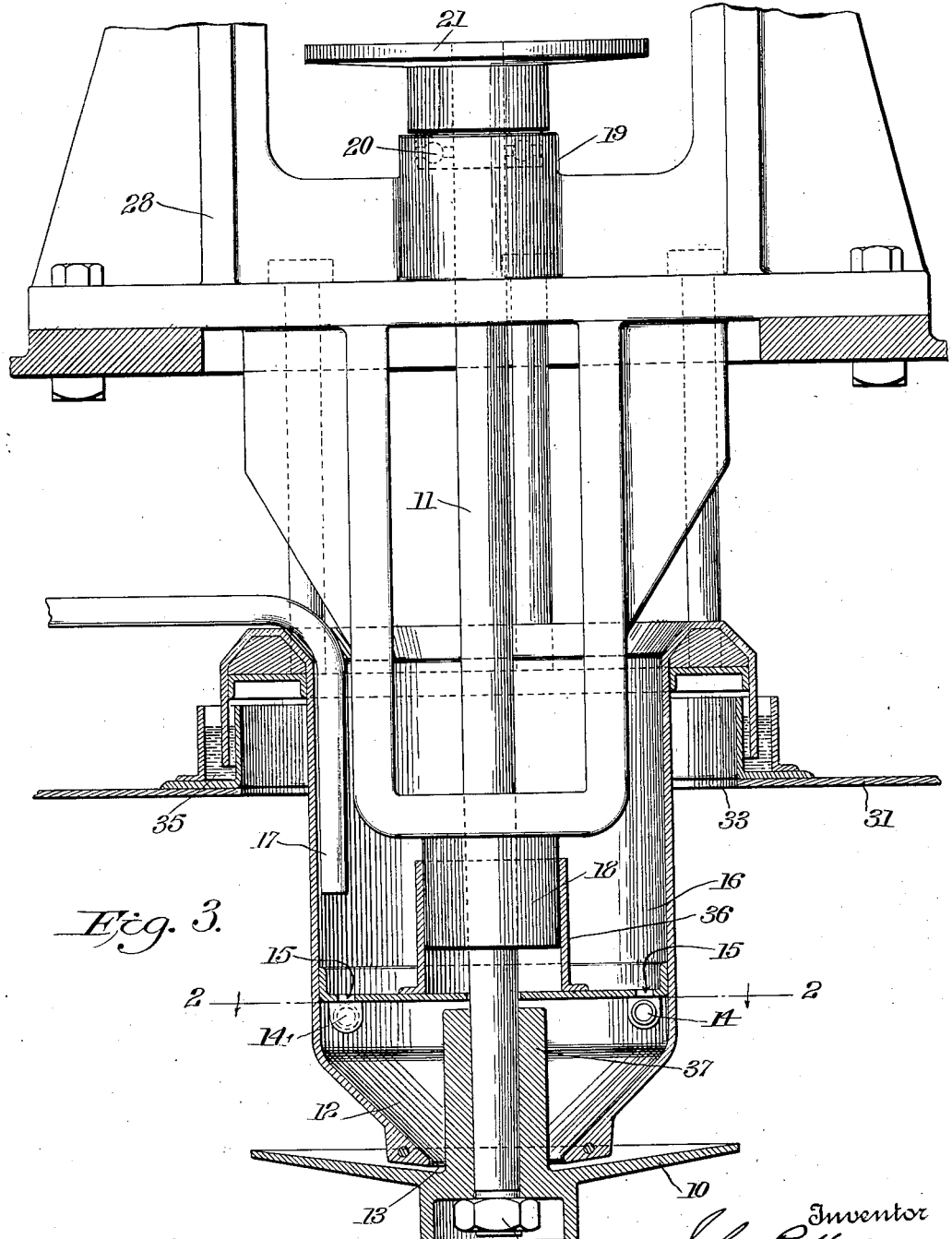

UNITED STATES PATENT OFFICE.

JOHN PATTEN, OF BALTIMORE, MARYLAND, ASSIGNOR TO DAVISON CHEMICAL COMPANY, OF BALTIMORE, MARYLAND, A CORPORATION OF MARYLAND.

ATOMIZER FOR FLUIDS.

1,219,994. Specification of Letters Patent. Patented Mar. 20, 1917.

Application filed April 23, 1914. Serial No. 833,936.

*To all whom it may concern:*

Be it known that I, JOHN PATTEN, a citizen of the United States, and resident of Baltimore, Maryland, have invented certain new and useful Improvements in Atomizers for Fluids, of which the following is a specification.

The object of the present invention is a machine for atomizing fluids in large quantities. The invention is particularly useful in carrying out chemical processes on a large scale and is adapted for bringing liquids into intimate contact with gases. It is, however, generally applicable wherever it is desired to subdivide a liquid into minute particles. The invention will be more particularly described in connection with the accompanying drawing, in which—

Fig. 3 is an enlargement of a portion of Fig. 1, showing the atomizer in greater detail.

Figure 1:
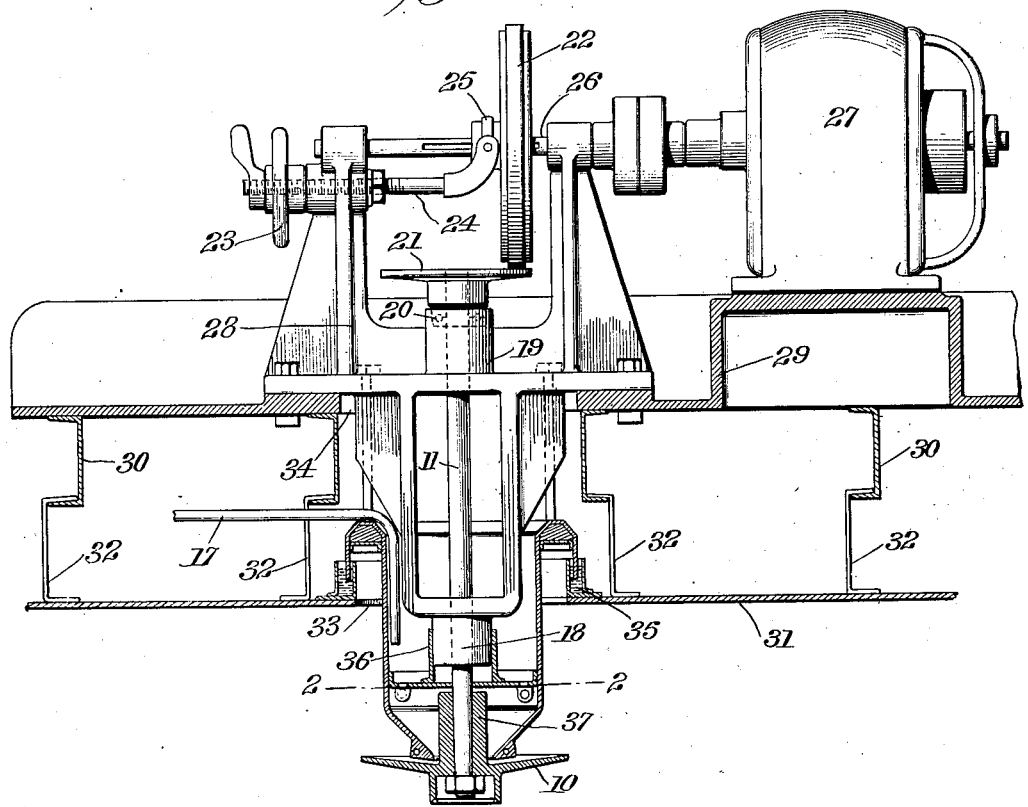
Figure 1 is a side elevation partly in section of an atomizing device embodying my invention including a motor for driving the same.
Figure 2:
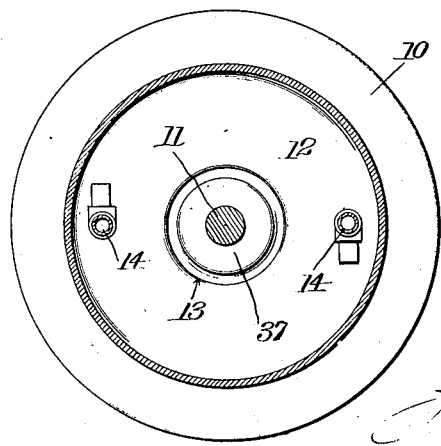
Fig. 2 is a sectional view on the line 2—2, Figs. 1 and 3, on a somewhat larger scale than Fig. 1.

Referring to the drawings, 10 indicates a rotatable disk which is mounted on a vertical shaft 11, being securely locked thereon. The disk 10 is preferably dished or concave on its upper side. Just above the disk is a fluid supply chamber 12 which discharges through an annular opening 13 onto the disk near the axis thereof. The supply chamber 12 is preferably of inverted conical form and the fluid is preferably injected into said chamber tangentially, as by the nozzles 14 which receive fluid through openings 15 in the bottom of a small tank 16. The tank is supplied continuously, when the apparatus is running, by a suitable inlet pipe 17. The shaft 11 is rotated rapidly by any suitable means. As shown, the shaft is mounted in bearings 18, 19, and supported by a suitable ball thrust bearing 20, shown in dotted lines. On the other upper end of the shaft is a friction disk 21 which is rotated by a friction wheel 22. The wheel 22 is adjustable radially with respect to the disk 21 to vary the speed of the latter, the adjustment being effected as shown by means of a hand wheel 23 operating on a threaded rod 24 which engages the collar 25 on the hub of the friction wheel 22. The friction wheel 22 slides on and turns with a shaft 26 which, as shown, is driven by an electric motor 27.

In the particular adaptation of my invention illustrated in the drawings, it is used for spraying acid within a lead chamber. The bearings for the shafts 11 and 26 are supported on a cast frame 28 and this frame is carried by a base plate 29, which also supports the motor. The base 29 is carried on suitable supporting beams 30 and the top 31 of the chamber in which the atomizer works, which is of lead, is supported from the beams 30 by suitable hangers 32. In the lead top plate 31 there is a circular opening 33 through which the atomizing disk 10 may be withdrawn and in the base plate 29, there is a circular opening 34 through which the disk and its supporting shaft and bearings and other connected parts may be withdrawn. Surrounding the opening 33 is a lute 35 which seals the chamber below the top plate 31 against communication with the atmosphere. Surrounding the bearing 18 is a lead cylinder 36 which is connected to the bottom of the tank compartment 16 and which protects the bearing when atomizing acid or other substance which will attack iron. On account of the high speed at which the disk is rotated, it must be securely connected to the shaft and as one means of making such connection, I have shown the shaft tapered slightly at its lower end and fitting a corresponding opening in a hub or sleeve 37, the shaft being drawn tightly into the sleeve by a nut 38. The sleeve 37 is extended upwardly from the disk and protects the shaft against corrosive action when atomizing acids or other chemicals. The disk and hub should of course be made of metal which will not be affected by the fluids passing over them.

The operation of the described atomizer is as follows: The shaft 11 which carries the atomizing disk is rotated at high speed, preferably several thousand revolutions per minute. The acid or other fluid to be atomized is fed continuously through the pipe 17 into the tank compartment 16, and is discharged into the supply chamber 12 through the tangential nozzles 14. The fluid is thus given a rotary or swirling movement in the supply chamber which causes it to spread evenly over the lower wall of said chamber and to be discharged in an annular stream of uniform thickness at the mouth 13 of the supply chamber onto the inner part of the upper face of the disk 10. The mouth 13 is of course concentric with the disk 10 and the fluid is therefore supplied evenly around the disk. The rotation of the disk causes the fluid to travel outward to the periphery and it reaches the periphery in the form of a thin film which breaks up on leaving the disk into minute particles causing the liquid to take the form of mist which floats in a cloud in the chamber in which the atomizer is located and settles slowly. I have found that by making the upper surface of the disk dished or concave, that the film of fluid is sprayed more uniformly and dissipated more effectively than when the disk is a plane, although the latter form of disk will operate quite satisfactorily. The rapidly rotating disk creates certain currents in the air or gas in which it is operating which tends to distribute the atomized fluid throughout the area of the chamber in which the disk is operating. That is, the disk carries with it a certain amount of air or gas which is thrown outward by centrifugal force and which is replaced by air or gas coming from beneath and from above the disk. The circulation thus created causes the atomized particles of fluid to be distributed horizontally throughout the chamber in which the atomizer is operating, including the space beneath the atomizer.

Having thus described my invention, what I claim and desire to secure by Letters Patent, is:

1. In an atomizer, the combination of a disk rotatable about a vertical axis, means for rotating the disk, a supply chamber above and discharging fluid in an annular stream onto the top of the disk, and means whereby the fluid is admitted to said supply chamber tangentially so as to rotate and distribute the fluid in the supply chamber.

2. In an atomizer, the combination with a disk rotatable upon a vertical axis, of a supply chamber above and concentric with the disk, said supply chamber having an inverted conical bottom and an annular outlet adjacent the disk, and means for delivering fluid tangentially into the supply chamber, whereby the fluid is given a swirling movement in the supply chamber and delivered uniformly throughout the extent of the annular opening.

3. Means for atomizing fluid in a tank or vessel comprising a top for said vessel having an opening therein, a vertical shaft extending through the opening, a disk on said shaft below the opening, means for rotating said shaft and the disk thereon, a chamber for receiving fluid and for discharging the same onto said disk, the walls of said chamber being extended upward through the opening, and means for sealing said opening, substantially as described.

4. The combination with a tank or vessel provided with a top wall having an opening therein, of an atomizing mechanism comprising a shaft extending down through said opening, a disk on the part of said shaft within the tank, means outside the tank for rotating said shaft and the disk thereon, means for supplying fluid to the upper side of said rotatable disk, and means for sealing the opening in the top wall of said tank.

5. The combination with a tank or vessel provided with a top wall having an opening therein, of an atomizing mechanism comprising a shaft extending down through said opening, a disk on the part of said shaft within the tank, means outside the tank for rotating said shaft and the disk thereon, means for varying the speed of said disk, means for supplying an annular stream of fluid to the upper side of said rotatable disk, and means for sealing the opening in the top wall of said tank.

In testimony whereof I affix my signature in presence of two witnesses.

JOHN PATTEN.

Witnesses:
RALPH C. SHARRETTS,
J. IRVING CLARK.